Aug. 23, 1966     C. B. STOKER, JR     3,267,635
PACKAGING FILM
Original Filed Sept. 5, 1962     2 Sheets-Sheet 1
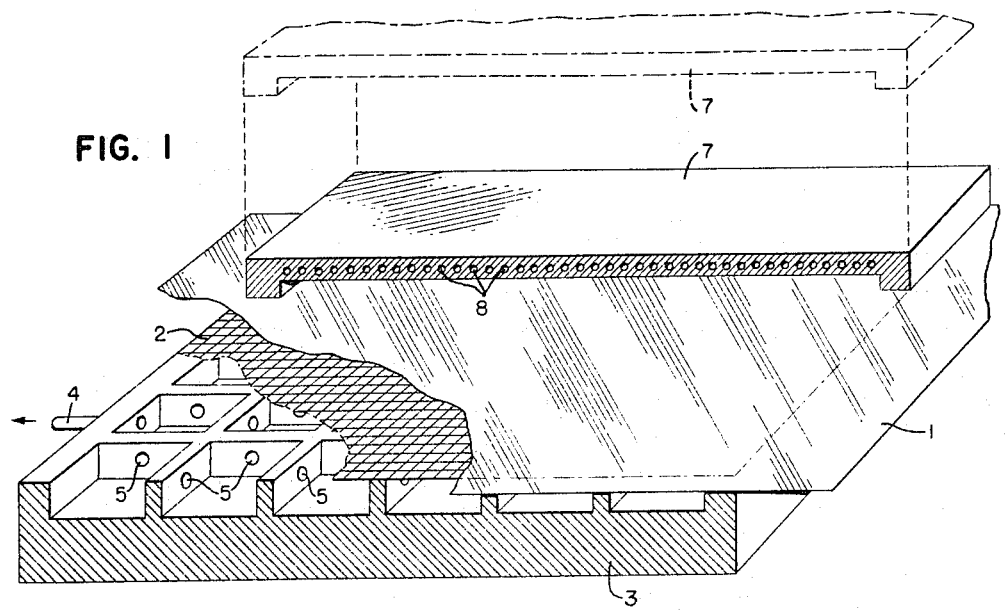
FIG. 1
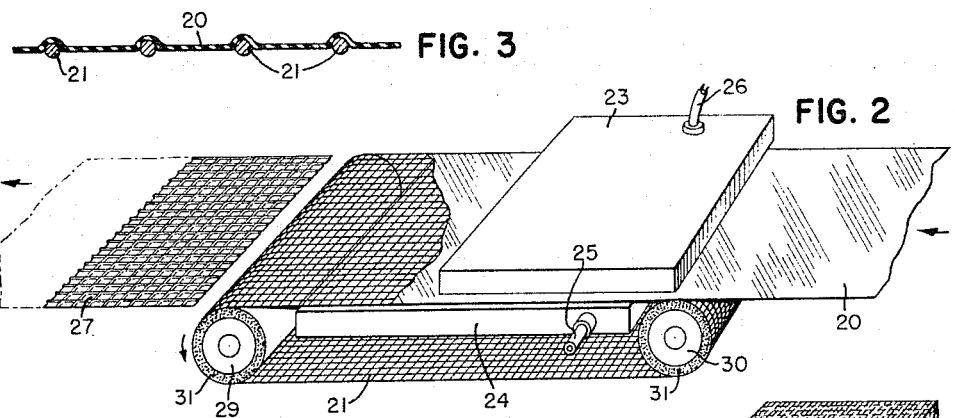
FIG. 3
FIG. 2
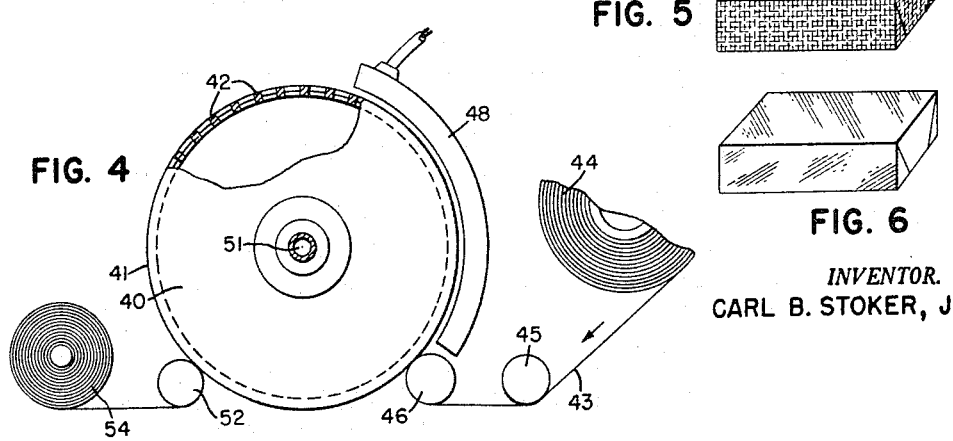
FIG. 5
FIG. 4
FIG. 6
*INVENTOR.*
CARL B. STOKER, JR.

Aug. 23, 1966  C. B. STOKER, JR  3,267,635
PACKAGING FILM

Original Filed Sept. 5, 1962  2 Sheets-Sheet 2

INVENTOR.
CARL B. STOKER, JR.

United States Patent Office 3,267,635
Patented August 23, 1966

3,267,635
PACKAGING FILM
Carl B. Stoker, Jr., Akron, Ohio, assignor to The Goodyear Tire & Rubber Company, Akron, Ohio, a corporation of Ohio
Original application Sept. 5, 1962, Ser. No. 221,560. Divided and this application Feb. 17, 1964, Ser. No. 345,172
2 Claims. (Cl. 53—30)

This invention relates to the use in packaging of a transparent film of a thermoshrinkable material. The application is a division of my application Serial No. 221,560 filed September 5, 1962.

The film utilized in carrying out the invention lies flat on a flat surface and includes some areas stretched more than other areas. Areas stretched to different extents are located side by side throughout the entire area of the film. At the boundaries between the areas stretched to different extents, the stretched areas are raised so that they extend away from the plane of the adjacent unstretched areas. Thus, the surfaces of the film contain irregularities, but the opposite surfaces of the film are parallel to one another because the irregularities are of a concavo-convex nature. The amount the areas are raised is very small, and the entire film lies flat on a flat surface although because of the irregularities only a part of the film surface contacts the flat surface.

A chief advantage of such a film is that because of the irregularities in its surfaces adjoining films produce only a small area of contact with one another. Consequently, when two sheets of the film are placed one on top of the other, or two walls of a bag come in contact with one another they are easily separated because of the small area of contact between them. Furthermore, static is a function of the contacting area of adjacent surfaces, and by minimizing the areas of contact between adjacent films or between one film and a surface of packaging equipment, static adherence is minimized.

Also, because of the small area of contact between the film and any flat surface with which it is in contact, the friction between the film and rolls, platens or folders, etc. of packaging machinery is greatly reduced so that even though the film be very thin and/or tacky it will travel through the machinery without difficulty at high speeds. Further, the film is mechanically stiffened by the surface irregularities, and this aids in conveying it across platens, folders, etc. of packaging machinery.

The irregularities interfere with the visibility of the contents of the package through the transparent film when used for packaging, but if a package formed with the film is heated, the film shrinks and the contents of the package become clearly visible through the film. Before shrinking the film preferably forms a relatively tight fit around the contents of the package whether that be a solid, a granular material or a liquid. On heating, the film loses its stretch and forms a snug fit around the contents of the package.

The film is produced from perfectly flat film either (1) by stretching limited areas throughout the entire film, or (2) by reducing or removing the stretch from limited areas of a stretched film.

The areas in which the film is stretched to a greater extend may be raised from only one surface of the film, or some may be raised from one surface and others from the other surface.

Thermostretchable films of the type to which this invention relates include films of vinyl resins, vinyl chloride-vinylidene chloride copolymer, rubber hydrochloride, polyethylene, polypropylene, nylon, etc., and particularly thin films and/or films which contain sufficient plasticizer to render them tacky. By thin films we refer to films no more than about .001 inch thick.

Thermostretchable films can be stretched when heated above room temperature, and if they are then cooled they remain stretched. On subsequent heating they shrink and tend to return to the size of the unstretched film.

The film of this invention is made by stretching portions but not all of the film, or by further stretching limited areas of films previously stretched, or, alternatively, by shrinking areas of a previously stretched film without shrinking the entire film area. Thus, areas of greater stretch are produced adjacent areas which are stretched to less extent and may not be stretched at all, and areas of one of these types—that is, either the various areas of greater stretch or the various areas of lesser stretch are found closely adjacent to one another bounded and separated by areas of the other type. Generally, areas of one type surround areas of the other type, but this is not essential. For instance, the areas of different types may extend from one side of the film to the other, alternating with one another, and making a film that will shrink in only one direction when heated. Preferably, the areas of films stretched to different extents are so intermixed that on heating the film shrinks bi-axially.

In a preferred method of producing areas of greater stretch from film which has not been stretched or a film which has been previously stretched uniformly, the film is placed over a wire screen or the like and heated to a temperature at which it is stretchable, and then a vacuum is drawn from the opposite side of the screen. This sucks the film down into the mesh of the screen and produces a waffle-like effect except that there are depressed areas on only one surface of the film between the raised areas produced by the wires of the screen. Instead of using a screen and vacuum, the film may be stretched between two plates or rollers having complementary depressed and raised areas. The stretched areas may be raised from only one surface of the film or from both surfaces. Films may be stretched in this way, either uniformly over the entire film or to produce a random or patterned effect. Many other means of producing the desired stretched areas are available.

Alternatively, the desired irregularities may be produced from a previously stretched film as by shrinking limited areas. A random effect may be produced by spraying droplets of hot water against the stretched film to cause shrinkage where the droplets touch the film. Limited areas of the stretched film may be contacted by heated prongs of a roller over which the film is passed, or by suitable contact with other means.

The foregoing are illustrative of the procedures by which the film of this invention can be produced, although the invention is not limited to such procedures. Different methods of producing the film, etc. are illustrated in the accompanying drawings, in which—

FIGURE 1 is an isometric view of equipment used for stretching limited areas of the film on a batch basis, the film and equipment being partly broken away to more clearly illustrate the invention;

FIGURE 2 is an isometric view of equipment for treating film on a continuous screen, the film being partially broken away to better illustrate the equipment;

FIGURE 3 is an enlarged section through film stretched while on a screen, as illustrated in FIGURE 2;

FIGURE 4 is a sectional view illustrating the preparation of film on a perforated drum, the end of the drum being partially broken away;

FIGURE 5 is a view in perspective of an article wrapped in the film produced by the process of FIGURE 1 or FIGURE 2, prior to heating;

FIGURE 6 is a view of the same after heating;

Figure 7:
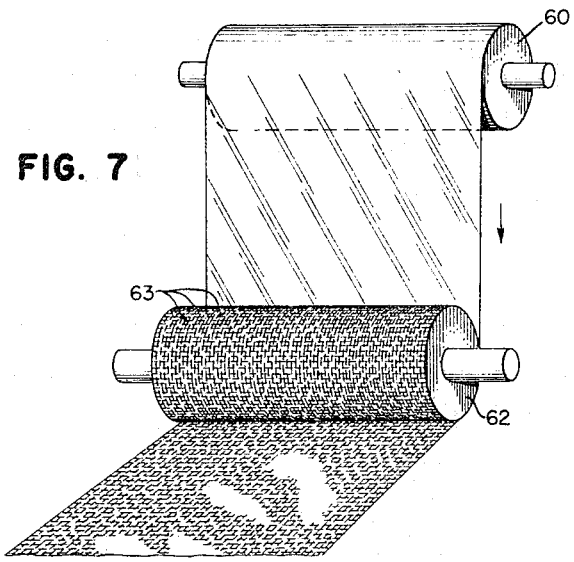
FIGURE 7 is an isometric view of a roller with heated prongs used to shrink isolated areas of a stretched film.

In FIGURE 1 the film 1 rests on the screen 2 which is supported on the sectionalized vacuum chamber 3. Vacuum is drawn through the line 4 into one section of the chamber and is communicated to the other sections through the holes 5. The screen rests on the partitions of chamber 3. Individual films are preferably clamped against the edges of the vacuum chamber 3 or otherwise held in an extended position by clamps, tenter fingers or other means (not shown).

With the film in place, the heater 7 with heating elements 8 embedded in it (the electrical connections being omitted) is lowered from the upper position shown in dot-dash lines to a position sufficiently near the film to heat and soften it. If the edges of the heater are placed on to the film they must be heat-insulated to prevent undesirable shrinkage around the entire border of the film.

When the film has been heated to a desired temperature, vacuum is applied to the sectionalized chamber through the connection 4 and the film is drawn down into or through the open areas of the screen. This produces a waffle-like effect. The film is preferably cooled before being separated from the screen. Whether the stretched area be the whole of each area of the film sucked into the various squares formed by the crossed wires or merely the area adjacent the wires, only limited areas of the film are stretched, and the stretched areas surround the unstretched areas. If the screen is replaced by a pronged support, unstretched areas will surround stretched areas.

Instead of stretching the film on a batch basis, a continuous machine such as illustrated in FIGURE 2 may be employed. The film 20 is moved progressively over the continuous screen 21. Both are moved in the direction of the arrows, and usually the film and screen will be moved at the same speed between the heater 23 and the vacuum chamber 24. The vacuum chamber is connected to a vacuum pump or the like through line 25 and the heater is heated by electric current supplied through the connections 26 or by other suitable means such as a steam chamber, a source of radiant heat, etc. Preferably the film comes under the front edge of the heater before vacuum is applied to it.

The temperature to which the film is heated depends upon the chemical composition of the film and the temperature at which it softens and becomes stretchable, and the amount of vacuum will be coordinated with the temperature to control the amount that the film is stretched.

The screen is continuous and the rollers 29 and 30 are preferably covered with rubber 31 to provide the friction desired for moving the screen.

The finished film 27 is shown as separated from the stretching machine. The film can be cut to sheets of predetermined size as it leaves the machine, or it may be carried forward as a continuous sheet.

FIGURE 3 is an enlarged view of the film produced on equipment such as that shown in FIGURE 2 while still supported on the screen. If the original film is very thin and limp, a smaller mesh is desirable than where stiffer film is employed. The distance between the wires 21 may be greater or less, depending upon the stiffness of the film, the temperature to which it is heated, its composition, etc. Preferably this distance is about ¼ to ⅟₁₆ inch.

FIGURE 4 illustrates a drum 40 with a perforated cylindrical surface 41. The perforations 42 are spaced rather close together (although this is not indicated in the drawing). The distance between the perforations can be uniform and may be the same both circumferentially of the drum and across the drum surface, or they may be arranged to produce a desired pattern in the film.

The film 43 is taken from the roll 44 and passes under the guide rollers 45 and 46. The roller 46 presses the film against the drum surface. While moving with the drum, the film is heated by the heater 48 to a required temperature which depends upon the composition and thickness of the film. As the drum rotates the film is heated and then sucked down into the openings by suction produced within the drum through suction means connected to the hollow axis 51. The action of the suction is limited to a narrow lateral belt across the surface of the drum by providing cover for the inner surface of all but a few of the perforations which produce the desired stretch. The cover is maintained in a permanent position with respect to the heater 48. Then as the film reaches the roller 52 it is separated from the drum surface. In the roll 54 of finished film the irregularities prevent large surface contact of adjacent areas of the film. For this purpose it is desirable that the spacing between the centers of the openings 42 be varied around the entire circumference of the film so that in contacting layers in the roll 54 the distances between the raised areas of the film will differ laterally and/or longitudinally.

Limited areas of the film may be shrunken instead of being stretched in the manner described in connection with the preceding drawings. The film in the roll 60 (FIGURE 7) is perfectly flat but it is stretched or oriented in one or both directions. The surface of the roll 62 is covered with prongs 63. This roll (or at least the prongs) are heated. The film is not heated. The areas of the film contacted by the prongs become heated and shrink. The stretched film between the heated areas puckers, making small irregularities in the surface of the film. The unstretched areas are surrounded by stretched areas. If a screen is substituted for the prongs, stretched areas are surrounded by unstretched areas.

After an article or the like has been packaged in film so treated, and the film is then heated, the balance of the film—that is, the puckered areas—are shrunk to the contents of the package. By removal of the puckered areas the contents of the package become clearly visible through the film.

Figure 8:
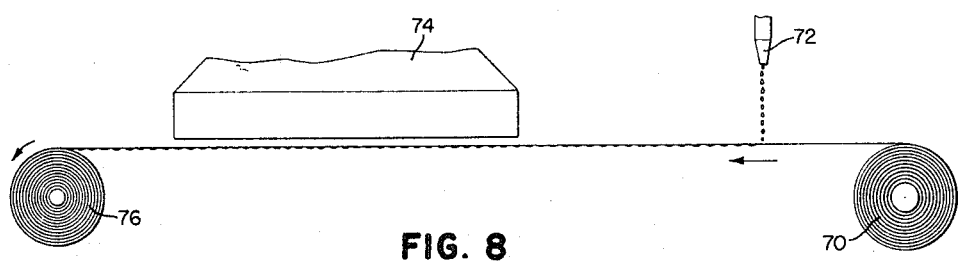
FIGURE 8 is a section illustrating how limited areas of the film can be shrunk by drops of hot water.

Instead of using heated projections on a roll or the like for shrinking limited areas of the film, a liquid such as hot water can be sprayed onto the film in such a way that areas of the film about the size of the droplets are shrunk, and this is illustrated in FIGURE 8. The stretched film 70 is withdrawn from the supply roll and moved in the direction of the arrow. A nozzle 72 the width of the film is provided to emit droplets of water at narrowly spaced intervals on the surface of the film. The intervals are such that the drops shrink individual areas of the film, and areas between the drops are not shrunk but pucker up. The film is passed under the dryer 74 where it is dried without heating it to the temperature required to shrink the film and then rolled up at the take-up roll 76.

The stretched film is used for packaging in packaging machinery in the usual way but with the stretched areas away from the material to be packaged. Because of the surface irregularities the film slides over the platens, folders, etc. of the machinery much more readily than a flat film of the same composition, particularly if the film be very thin and/or tacky. While still within the packaging machine or after leaving it, the film is heated sufficiently to cause the stretched areas to shrink toward the material to be packaged. FIGURE 5 illustrates an article packaged in film of this invention; and FIGURE 6 illustrates the same package after heating to produce a clear film wrap. If the film is oriented before being treated by means such as suggested by FIGURES 7 and 8, when the package is heated the irregularities shrink away and simultaneously the oriented areas of the stretched film shrink against the contents of the package.

The invention is covered in the claims which follow.

What I claim is:

1. The process of forming a package, using transparent thermoshrinkable film having different areas of the film over substantially the whole of the film area being stretched relatively more than adjacent areas to form irregularities of a concavo-convex nature, the stretched areas extending into a different plane from the relatively unstretched areas, which process comprises enclosing the material to be packaged in the film with said unstretched area adjacent the material to be packaged and forming an enclosure thereabout which is greater in area than the surface area of said material by substantially the amount that the film area is increased by virtue of certain areas having been stretched, and then heating the film and thereby causing the stretched areas of the film to contract toward the material to be packaged whereby the film forms a tighter enclosure about the material to be packaged.

2. The method of packaging an object in transparent thermoshrinkable film, which film comprises criss-crossed stretched areas separated by narrower areas not so stretched which gives the film a concavo-convex quilted appearance, which process comprises enclosing said object in the film with said narrower areas adjacent the object and forming an enclosure thereabout which is greater in area than the surface of the said object by substantially the amount the film area is increased by virtue of said criss-crossed areas having been stretched, and then heating the film and thereby causing said criss-crossed areas to contract toward the object wheerby the film forms a tighter enclosure about the material to be packaged.

References Cited by the Examiner

UNITED STATES PATENTS

| | | |
|---|---|---|
| 2,906,627 | 9/1959 | Payton et al. |
| 2,934,865 | 5/1960 | Pfeiffer _____ 53—22 |
| 3,017,302 | 1/1962 | Hultkrans. |
| 3,022,543 | 2/1962 | Baird et al. |

FRANK E. BAILEY, *Primary Examiner.*

TRAVIS S. McGEHEE, *Examiner.*

S. ABEND, *Assistant Examiner.*